March 25, 1941.   H. L. POTTER   2,236,200
SEAL BEARING
Filed Oct. 5, 1939
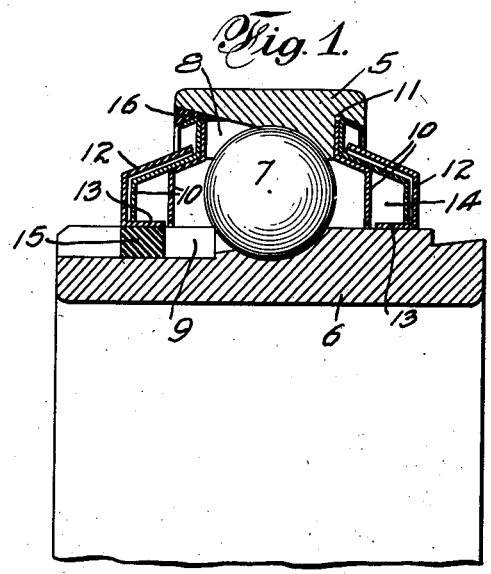
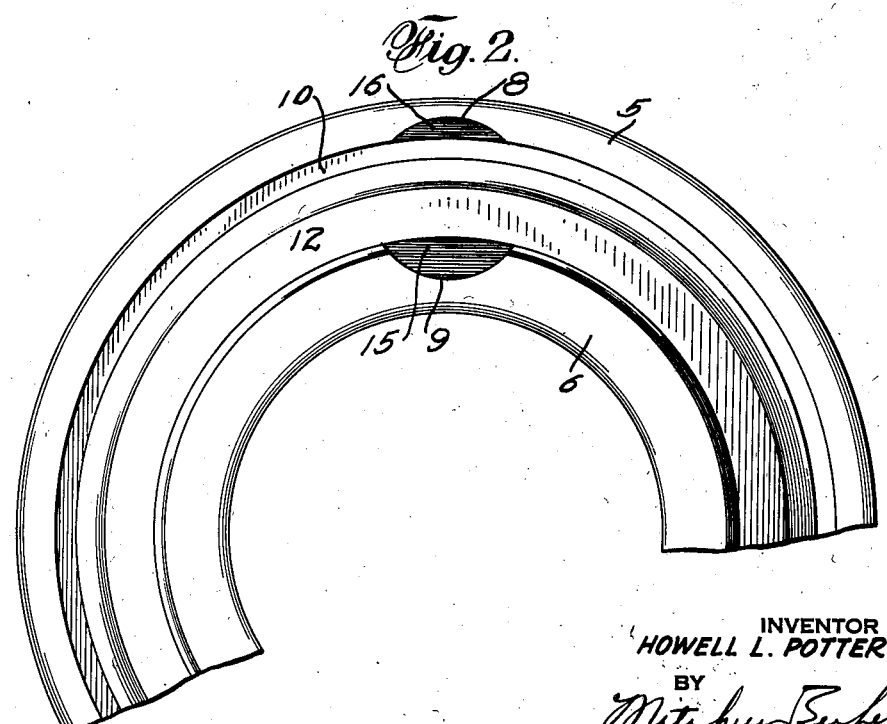
INVENTOR
HOWELL L. POTTER
BY
ATTORNEYS

Patented Mar. 25, 1941

2,236,200

UNITED STATES PATENT OFFICE 2,236,200

SEAL BEARING

Howell L. Potter, New Britain, Conn., assignor to The Fafnir Bearing Company, New Britain, Conn., a corporation of Connecticut Application October 5, 1939, Serial No. 298,015

4 Claims. (Cl. 308—187.2)

My invention relates to an anti-friction bearing, particularly of the so called "maximum" type, wherein the latter anti-friction bearing members must be entered through a filler opening formed by a filler slot provided in one or both rings.

It has been difficult and expensive heretofore to make satisfactory double sealed bearings of the maximum capacity type, due to the difficulty and expense of properly closing the filler slot in the ring or rings. Some seal bearings in which the inner ring has a filler slot have sometimes been rabbeted to a point beneath the filler slot and the seal has been positioned adjacent said rabbeted surface. However, such a surface unless ground makes an unsatisfactory surface for a felt seal type of bearing, and for a plate seal type of bearing the rabbeted surfaces are often too inaccurately formed in manufacture to be serviceable. Usually, both the inner and the outer ring of the bearing are provided with filler slots but the filler slot in the outer ring is quite often readily covered by a seal plate. However, my invention relates to the closing of filler slots, whether such slots be in either the inner or the outer ring or both.

It is the principal object of my invention to provide improved means for closing the filler slot or slots of a maximum type anti-friction bearing.

It is another object to provide an anti-friction bearing, one of the rings of which has a filler slot with a seal, together with improved means for closing the filler slot.

Other objects and features of the invention will be hereinafter pointed out or will become apparent to those skilled in the art.

In the drawing which shows, for illustrative purposes only, a preferred form of the invention—

Fig. 1 is a fragmentary edge view in section of a ball bearing illustrating features of the invention; and Fig. 2 is a fragmentary side view in elevation of the bearing shown in Fig. 1.

The bearing illustrated includes an outer bearing ring 5 and a long inner bearing ring 6 with interposed anti-friction bearing members, such as balls 7. In the form shown the outer ring is provided with a filler slot 8 and the inner ring is provided with a filler slot 9, such slots being usually provided in bearings of the maximum type for the purpose of permitting the insertion of the last few balls between the two rings.

The bearing is of the double seal type and the seals at opposite sides in the instant disclosure are duplicates of each other. Such seals include a pair of seal plates 10, secured to the outer ring as by crimping the outer edge of one of the plates into an undercut groove 11, as will be understood. The other ring, in this case the inner ring, carries a cooperating seal plate 12, which is provided with an inwardly directed sleeve or extension 13, tightly fitting the circumferential outer surface of the inner ring 6. The sleeve 13 in the form shown extends beneath one of the seal plates 10 and up along its outside surface, as will be clear from the drawing. If desired a felt seal ring may be placed in the space 14 and rub on the outer surface of the sleeve extension 13.

The sleeve 13 or the part of the seal fitting the inner ring is designed to fit tightly upon the outer surface of the inner ring and, of course, spans the filler groove 9. Such spanning of the groove, of course, leaves a generally lune-shaped space formed by the filler slot and the inner surface of the spanning portion of the sleeve 13. In accordance with my invention I fill such generally lune-shaped space by means of a plug 15 of resilient material, preferably oil-resistant and sufficiently resilient to crowd into all spaces or interstices to seal the bearing against loss of lubricant or entry of foreign matter through the filler slot. The closure plug 15, while it may be made of various materials, is preferably formed of artificial rubber, which is oil-resistant. One such material is known in the trade as "Thiokol." The plug 15 is initially made of the general shape of the space which is to be filled, but slightly larger in extent, so that the inherent expansibility of the material causes it to completely fill the space and squeeze into any and all openings to form an oil-tight seal. The plug may be held in place by its inherent resiliency, causing it to expand into the space between the seal plate 13 and the inner ring, or the plug 15 may be cemented to the inner ring or the seal 13, or to both.

When the filler slot of the outer ring is not adequately covered by the seal plates 10, for example, as shown at the left of Fig. 1, I provide a closure plug 16 to oil-seal any opening between the outer filler slot 8 and the seal plates 10 carried by the outer ring. Such outer closure 16 is of the same general type and is held in place and functions in substantially the same manner as heretofore described in connection with the closure plug 15.

It will be seen that I have provided exceedingly simple, inexpensive, yet highly efficient means for closing the filler slot or slots of a maximum type bearing, thus greatly facilitating the manufacture of double sealed bearings of the maximum capacity type.

While the invention has been described in considerable detail and a preferred form illustrated, it is to be understood that various changes and modifications may be made within the scope of the invention as defined in the appended claims.

I claim:

1. A bearing, including inner and outer bearing rings with interposed anti-friction bearing members, one of said rings having a filler slot therein, a seal member circumferentially fitting the ring having said filler slot and spanning the latter, and a plug of resilient material in said filler slot and substantially completely filling the space between said slot and the spanning portion of said seal member and resiliently engageable with said slot and seal member.

2. A bearing, including inner and outer bearing rings with interposed anti-friction bearing members, one of said rings having a filler slot, and a closure for said filler slot, said closure comprising a plug of resilient material held therein.

3. An anti-friction bearing, including inner and outer bearing rings with interposed anti-friction bearing members, one of said rings having a filler slot therein, a seal plate carried by said latter ring and having a sleeve portion circumferentially fitting said ring and spanning said filler slot, and a plug of resilient material expansibly fitting said slot and the spanning portion of said sleeve for substantially completely filling said slot.

4. An anti-friction bearing, including inner and outer bearing rings with interposed anti-friction bearing members, one of said rings having a filler slot therein, and a plug of oil-resistant rubber-like material expansibly fitting in and closing said slot.

HOWELL L. POTTER.